(12) United States Patent
Kostun

(10) Patent No.: US 6,427,112 B1
(45) Date of Patent: Jul. 30, 2002

(54) METHOD OF TUNING A VEHICLE

(75) Inventor: John David Kostun, Brighton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 50 days.

(21) Appl. No.: 09/771,460

(22) Filed: Jan. 26, 2001

(51) Int. Cl.[7] .................... F02M 35/16; G01M 15/00
(52) U.S. Cl. .............. 701/111; 701/114; 123/184.57; 60/312; 73/117
(58) Field of Search .................. 701/111, 114; 123/184.53, 184.57; 60/312; 381/71.4; 73/116, 117

(56) References Cited

U.S. PATENT DOCUMENTS 5,839,405 A * 11/1998 Falkowski et al. ..... 123/184.57

* cited by examiner

Primary Examiner—Andrew M. Dolinar
(74) Attorney, Agent, or Firm—John E. Kajander

(57) ABSTRACT

A method of tuning a vehicle includes measuring a plurality of inlet and outlet frequency responses at the inlet and outlet ports, respectively. The inlet and outlet responses each include an amplitude response and phase response. The method also includes determining inlet and outlet transfer functions that include amplitude and phase responses. An interior noise spectrum is determined and the engine air in/out system is modified based on the interior noise spectrum to result in a different interior noise spectrum.

14 Claims, 10 Drawing Sheets

METHOD OF TUNING A VEHICLE

TECHNICAL FIELD

The present invention relates to a method of tuning a vehicle engine induction and exhaust system and corresponding vehicle sound transmission paths.

BACKGROUND ART

There are many noise sources in a vehicle. For example, there is structure born noise such as vibrating body panels. In addition, there is noise from the vehicle air in/out system. The noise produced by the various noise sources of the vehicle travels to the vehicle interior where some of the noise is heard by vehicle occupants. To enhance the vehicle image, it is important that the noise heard by the occupants is consistent with the image of the vehicle, i.e., sound of power for a sports car, quiet pleasing sound for a luxury vehicle, etc.

For the foregoing reasons, there is a need for a method of tuning the induction and exhaust system and corresponding vehicle sound transmission paths that improves over some existing vehicle noise vibration harshness (NVH) processes.

DISCLOSURE OF INVENTION

It is, therefore, an object of the present invention to provide a method of tuning a vehicle that considers the effects of the phase angle of the noise from different noise sources.

In carrying out the above object, a method of tuning a vehicle having an interior and an engine operable over a range of engine speeds is provided. The engine has an air in/out system including an induction system inlet and an exhaust system outlet. The method comprising measuring a plurality of inlet frequency responses at the inlet port to a plurality of different engine speed inputs. Each inlet response includes an amplitude response and a phase response. Further, a plurality of outlet frequency responses at the outlet port to a plurality of different engine speeds inputs are measured. The method further comprises determining an inlet transfer function and determining an outlet transfer function. The inlet transfer function generates a frequency response, including an amplitude response and a phase response, at the vehicle interior to an input at the inlet port. The outlet transfer function generates a frequency response, including an amplitude response and a phase response, at the vehicle interior to an input at the outlet port. The method further comprises determining an interior noise spectrum based on the plurality of inlet frequency responses, the inlet transfer function, the plurality of outlet frequency responses, and the outlet transfer function. And, the engine air in/out system is modified based on the interior noise spectrum to result in a different interior noise spectrum.

In a preferred embodiment, measuring the plurality of inlet frequency responses further comprises, for each different engine speed input wherein adjacent engine speeds in the plurality of engine speeds are about 50 rpm apart from each other, measuring the inlet response at a plurality of different frequencies in the audible spectrum. Adjacent frequencies at which the inlet response is measured are about 2 Hz apart from each other.

Further, in a preferred embodiment, measuring the plurality of outlet frequency responses further comprises, for each different engine speed input wherein adjacent engine speeds in the plurality of engine speeds are about 50 rpm apart from each other, measuring the outlet response at a plurality of different frequencies in the audible spectrum. The adjacent frequencies at which the outlet response is measured are about 2 Hz apart from each other.

A suitable inlet transfer function may be determined by measuring an interior frequency response to a white noise input at the inlet port. A suitable outlet transfer function may be determined by measuring an interior frequency response to a white noise input at the outlet port. In a preferred embodiment, determining the interior noise spectrum further comprises multiplying the plurality of inlet frequency responses by the inlet transfer function, in the frequency domain, to product a first plurality of interior frequency responses. Then, the plurality of outlet frequency responses are multiplied by the outlet transfer function, in the frequency domain, to produce a second plurality of interior frequency responses. And, the first and second pluralities of interior frequency responses are added to produce a third plurality of interior frequency responses.

It is appreciated that modifying the engine air in/out system may be performed in a variety of ways to achieve desired sound quality within the vehicle. For example, in some implementations it may be desirable to modify the engine air in/out system so that the resulting different internal noise spectrum emphasizes frequencies that are multiples of the engine firing frequency. Of course, in accordance with the present invention, the air in/out system may be modified to emphasize any particular frequencies, as desired. The engine air in/out system may be modified in many ways. For example, an expansion chamber, a quarter wave resonator, or a Helmholtz resonator, or any combination of these elements may be added to the air in/out system.

The advantages associated with embodiments of the present invention are numerous. For example, a method of tuning in accordance with the present invention considers both of the amplitude response and the phase response at both the inlet port and the outlet port of the air in/out system. In addition, the inlet transfer function and the outlet transfer function generate both amplitude and phase responses. By considering the effects of phase angle, embodiments of the present invention improve upon some existing techniques for tuning vehicles.

The above object and other objects, features, and advantages of the present invention will be readily appreciated by one of ordinary skill in the art in the following detailed description of the best mode for carrying out the invention when taken in connection with the accompanying drawings.

BEST MODE FOR CARRYING OUT THE INVENTION

Figure 1:
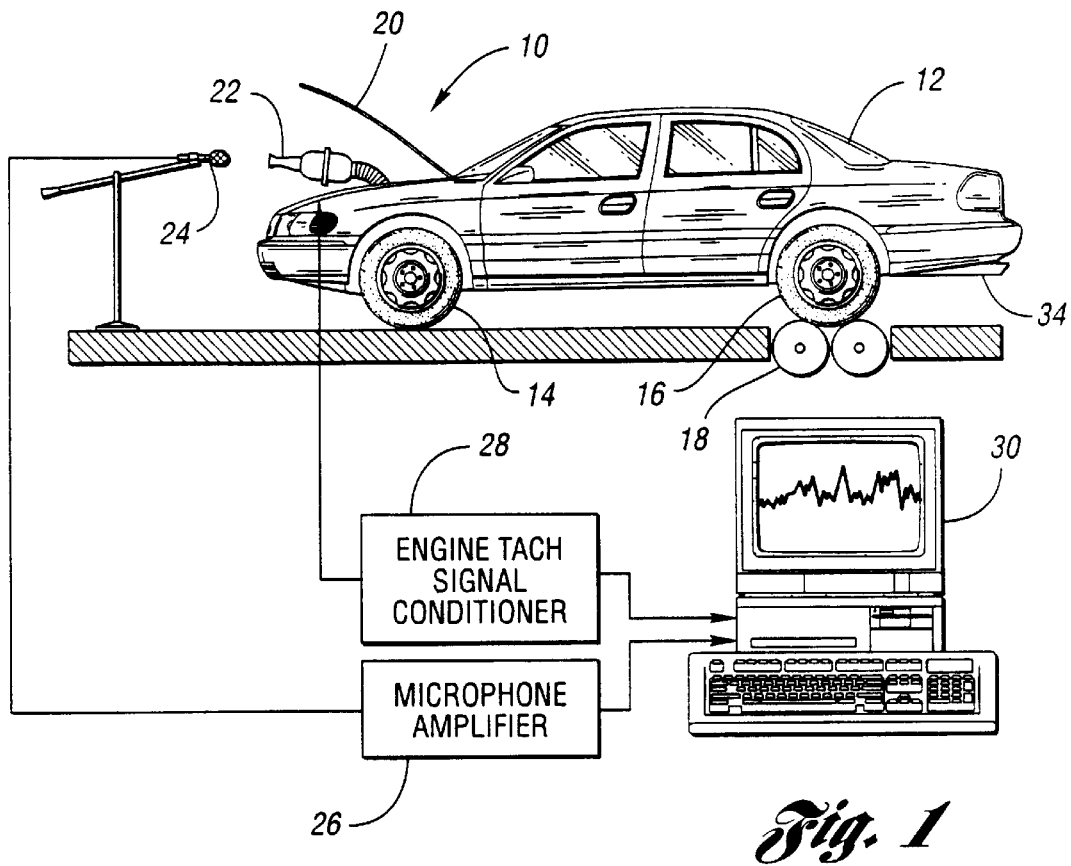
FIG. 1 illustrates measuring a plurality of inlet frequency responses in accordance with the present invention.

In a method of the present invention, induction and exhaust noise are utilized to achieve good vehicle sound quality as perceived inside the vehicle by the vector addition of induction and exhaust noise inside the vehicle through the application of vehicle transfer functions including the effect of phase differences between the sources. In FIG. 1, a chassis dynamometer is generally indicated at 10. Vehicle 12 includes front wheels 14 and rear wheels 16. Rear wheels 16 ride on dynamometer rolls 18. Hood 20 is shown open with the induction system inlet port 22 positioned near microphone 24. The output of microphone 24 is fed to microphone amplifier 26. In addition, the engine tachometer signal is read and sent to engine tachometer signal conditioner 28. The conditioned engine tachometer signal and the amplified microphone signal are delivered to frequency analyzer 30. A plurality of inlet frequency responses at the inlet port 22 to a plurality of different engine speed inputs are measured. Each inlet frequency response measured by the frequency analyzer includes an amplitude response and a phase response. Although any suitable spacing may be utilized for the engine speed inputs, preferred embodiments of present invention utilized a resolution of about 50 rpm between adjacent speed inputs. That is, the inlet frequency response is measured at the inlet port to a plurality of different engine speed inputs that are about 50 rpm apart from each other. Further, although the frequency response may be measured with any suitable resolution, preferred embodiments of the present invention measure the audio spectrum narrow band frequency response with a resolution of about 2 Hz. Although 2 Hz is preferred, other resolutions may be suitable such as measuring with adjacent measured frequencies being less than one-third octave apart from each other.

Figure 2:
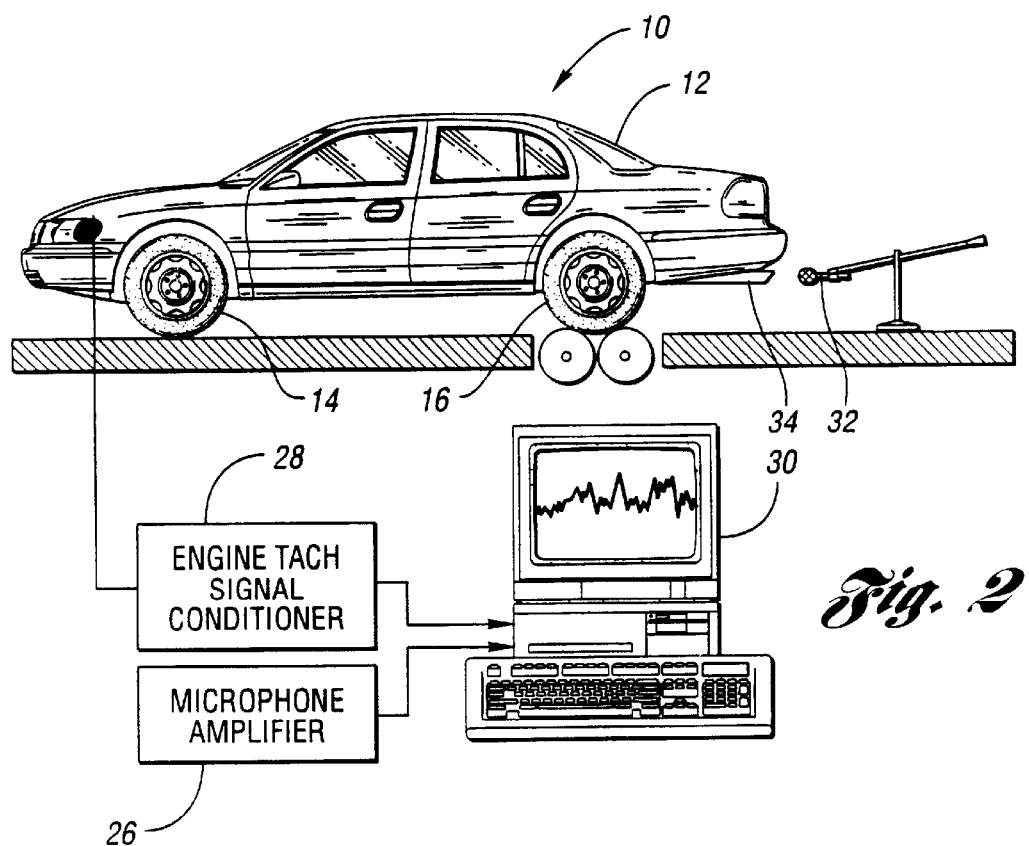
FIG. 2 illustrates measuring a plurality of outlet frequency responses in accordance with the present invention

In FIG. 2, like reference numbers are used to illustrate like elements that are also shown in FIG. 1. However, in FIG. 2, the microphone is indicated at 32 and is near the exhaust system outlet 34. In FIG. 2, a plurality of outlet frequency responses at the outlet port to a plurality of different engines speed inputs are measured. Each outlet frequency response include an amplitude response and a phase response. Similar to the measuring of the plurality of inlet frequency responses, the measuring of the plurality of outlet frequency responses is preferably a narrow band analysis. For example, in a suitable embodiment, each outlet response is measured at a plurality of different frequencies in the audio spectrum wherein adjacent frequencies are about 2 Hz apart from each other. Of course, 2 Hz is only a suitable resolution and other resolutions may also be suitable such as any appropriate resolution wherein adjacent frequencies are less than one-third octave apart from each other. In addition, it is preferred that the engine speed steps are small, such as about 50 rpm.

Of course, different step size for engine speed may be utilized as appropriate. To assure that the phase relationships of the sources relative to each other are preserved, it is required to measure the induction and exhaust simultaneously at the respective sources. Alternatively, the phase relationships can be preserved by measuring independently the induction and exhaust sources relative to a cam shaft tachometer reference signal.

Figure 3:
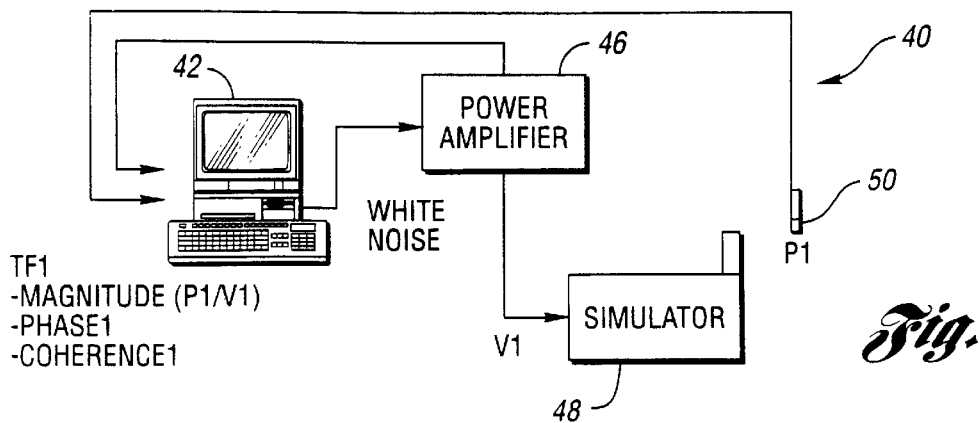
FIG. 3 illustrates measuring white noise.

FIG. 3 depicts source measurement. That is, measuring of the simulated noise source is generally indicated at 40. As shown, a spectrum analyzer 42 generates a white noise voltage signal that passes to power amplifier 46. The amplified white noise voltage signal at the simulator is fed back to the spectrum analyzer for comparison to the noise P1 generated at the simulator.

Figure 4:
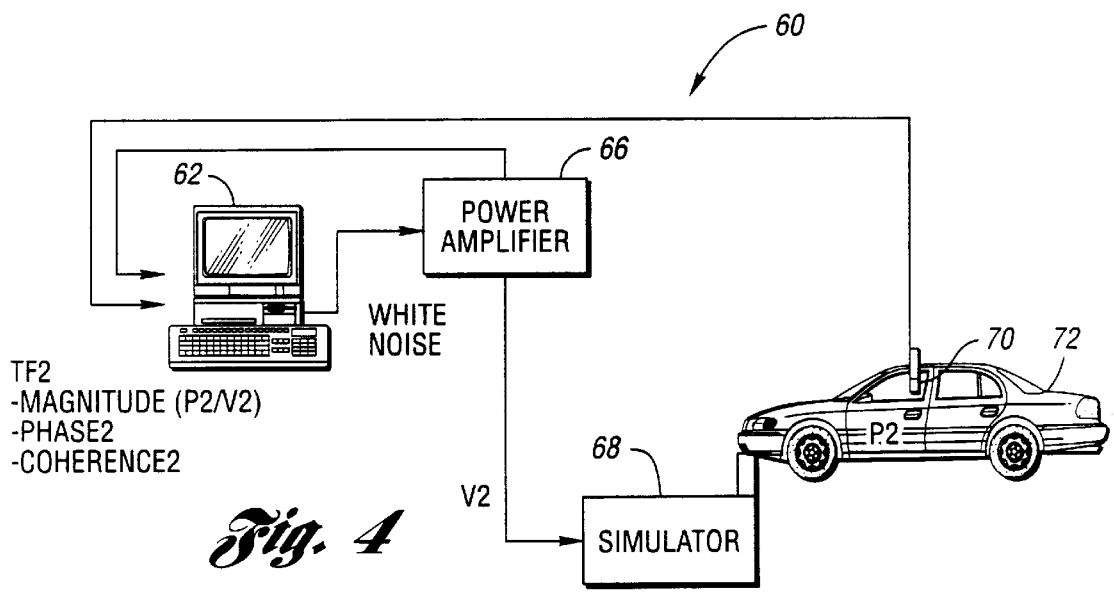
FIG. 4 illustrates determining an inlet transfer function in accordance with the present invention.

Power amplifier 46 supplies an amplified voltage to simulator 48. Microphone 50 measures pressure and sends a signal to spectrum analyzer 42. That is, white noise is generated and then measured. In FIG. 4 at 60, white noise is introduced at the normal location for the induction system inlet port and the resulting sounds at the vehicle interior are measured. As shown, spectrum analyzer 62 produces a white noise voltage that passes to the power amplifier 66. The amplified white noise voltage signal at the simulator 68 is fed back to the spectrum analyzer for comparison to the noise P2, the vehicle interior noise. Microphone 70 measures the noise inside a vehicle due to the white noise at the inlet port of vehicle 72.

Figure 5:
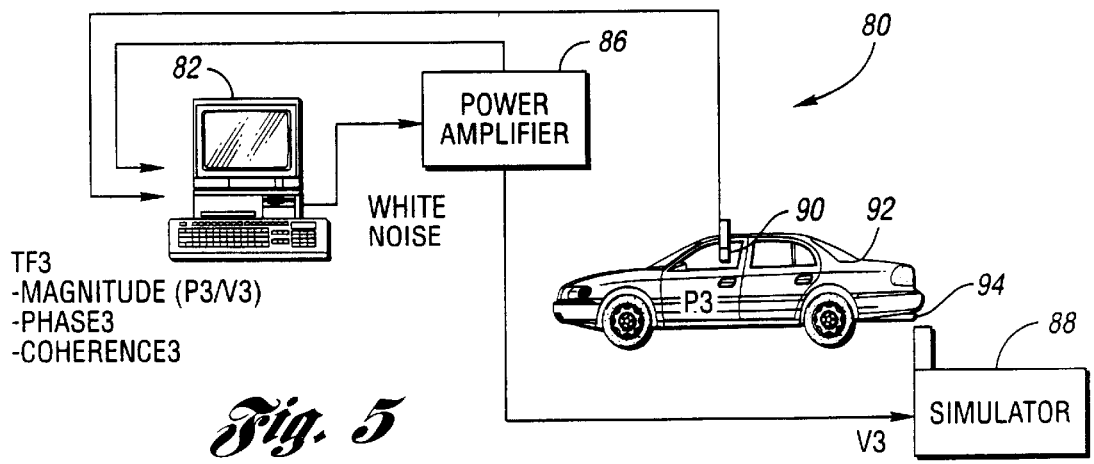
FIG. 5 illustrates determining an outlet transfer function in accordance with the present invention.

Similarly, in FIG. 5, interior sound measurement for interior sound due to white noise at the exhaust system outlet port is generally indicated at 80. Spectrum analyzer 82 produces a white noise voltage signal at power amplifier 86. The amplified white noise voltage signal is fed back to the spectrum analyzer for comparison to the noise P3, the vehicle interior noise. Simulator 88 generates white noise at the exhaust outlet port 94 of vehicle 92. Microphone 90 measures the interior noise caused by the white noise at the exhaust outlet port 94. It is appreciated that the measurements taken in FIGS. 3–5 are sufficient to determine both the inlet transfer function and the outlet transfer function, with both transfer functions including both gain and phase transfer components.

The intake transfer function is determined according to:

$$TF\_INLET = TF2/TF1$$

wherein TF1 is the transfer function of the simulator in FIG. 3, and TF2 is the transfer function from the simulator input to the vehicle interior in FIG. 4.

$$TF\_OUTLET = TF3/TF1$$

wherein TF1 is the transfer function of the simulator in FIG. 3, and TF3 is the transfer function from the simulator input to the vehicle interior in FIG. 5.

Each transfer function includes a magnitude portion and a phase portion. In addition, P_INLET is the frequency response at the inlet port that includes a magnitude portion and a phase portion. P_OUTLET is the frequency response at the outlet port that includes a magnitude portion and a phase portion. Most discussion herein refers to the frequency domain, however, it is appreciated that in order to listen to the noise, the responses may be represented in the time domain with the Inverse Fourier Transform. Alternatively, calculations may be carried out by convolving in the time domain.

There is also an alternate way of measuring and applying the transfer function. In this method the transfer function is determined by introducing the white noise source at the normal location for the inlet and then the white noise source measurement is taken at this point along with the vehicle interior response measurement. The actual induction noise source measurement is also taken at the normal location for the inlet, not the propped mode as is for the other method. There is also a reciprocity method for measuring the transfer function. In this method, the white noise source is placed inside the vehicle and the response at the induction system inlet is measured. The source measurement of the simulator is taken in the free field before it is put inside the vehicle. The bottom line of all this is that there are several alternate ways of measuring the transfer function and that the invention is not limited to any particular method.

Figure 6:
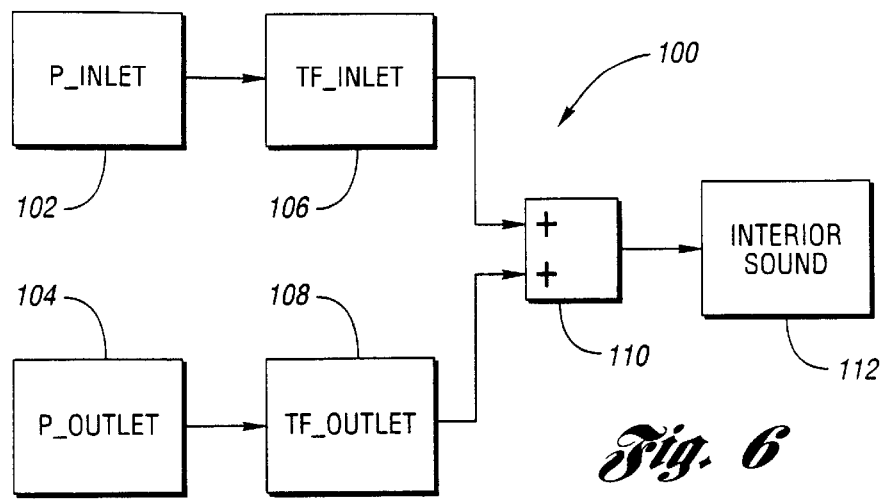
FIG. 6 is a block diagram illustrating determining an interior noise spectrum in accordance with the present invention.

In FIG. 6, the determining of an interior noise spectrum is shown, based on the measured plurality of intake frequency responses from FIG. 1, the measured plurality of outlet frequency responses from FIG. 2, the determined inlet transfer function from FIGS. 3 and 4, and the determined outlet transfer function from FIG. 4 and 5. Specifically, block 102 represents the plurality of inlet frequency responses to the plurality of different engine speed inputs with each inlet response including an amplitude response and a phase response. Specifically, block 104 represents the plurality of outlet frequency responses at the outlet port to a plurality of different engine speed inputs. Each outlet response includes an amplitude response and phase response. Block 106 represents the inlet transfer function and block 108 represents the outlet transfer function. As shown, P_INLET and TF_INLET are multiplied in the frequency domain and the product is inputted into summer 110. Similarly, P-OUTLET and TF_OUTLET are multiplied in the frequency domain and the product is inputted into summer 110. The inputs sum to produce the interior sound spectrum at block 112.

Figure 7:
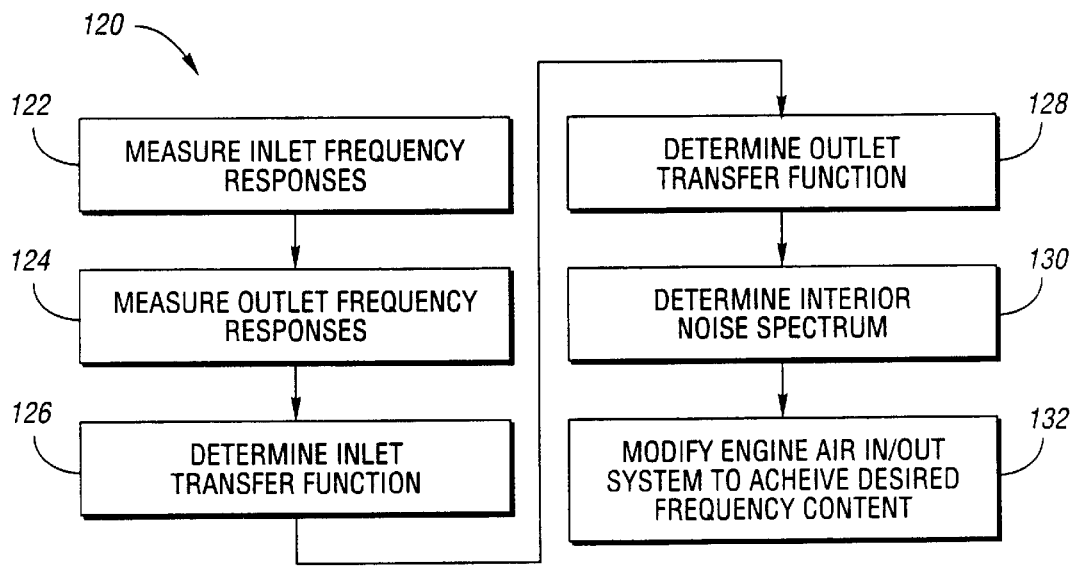
FIG. 7 is a block diagram illustrating a method of the present invention.

As shown in FIG. 7, a method of the present invention is generally indicated at 120. At block 122, inlet frequency responses are measured. At block 124, outlet frequency responses are measured. At block 126, an inlet transfer function is determined. At block 128 an outlet transfer function is determined. At block 130, the interior noise spectrum is determined and subjectively evaluated. At block 132, the engine air in/out system is modified to achieve desired frequency content. For example, the desired frequency content may include emphasis on harmonics of the engine firing frequency. The modifications to the air in/out system may be made so as to perform selective frequency and/or order tracked filtering.

Figure 8:
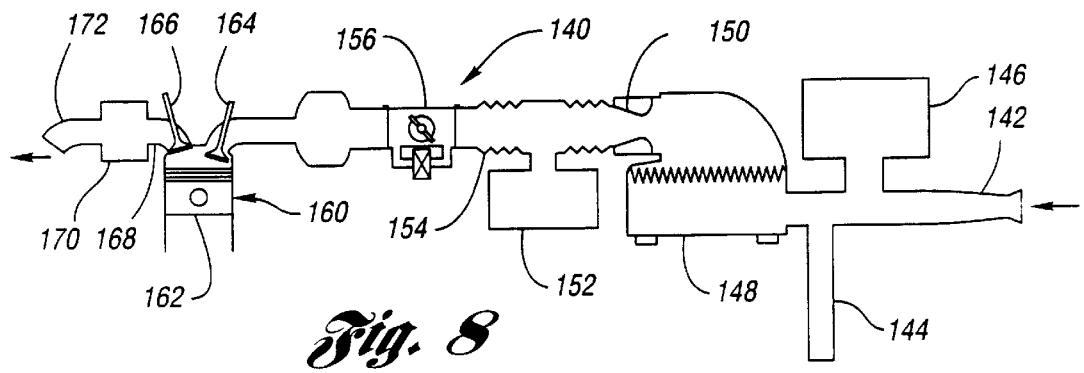
FIG. 8 illustrates an exemplary air in/out system including an induction system inlet port and an exhaust system outlet port.

In FIG. 8, an exemplary engine air in/out system is illustrated. In accordance with the present invention, modifications are made to the air in/out system to tune the vehicle. As shown in FIG. 8, engine air in/out system 140 includes an induction system inlet port 142. Air enters port 142 and is routed to air cleaner 148. Mass air flow sensor 150 measures air flow through the induction system. Also shown are clean air tube 154 and throttle body 156, which lead to cylinder.160. Cylinder 160 holds piston 162, and air flow through cylinder 160 is controlled by valves 164 and 166. Various components are used to tune the engine air in/out system such as Helmholtz resonators 146 and 152 and a quarter wave resonator 144. On the exhaust system side of air in/out system 140, passage 168 connects through exhaust muffler 170 and then to exhaust system outlet port 172. In the present invention, various resonators expansion chambers, etc, may be added to the air in/out system to emphasize desired frequency content. The desired content may be specific frequencies or may be specific engine orders that the frequency varies as engine speed varies.

It is appreciated that the vehicle may be tuned by modifications to the air in/out system as well as by modifications to the inlet and outlet transfer functions. For example, moving the inlet port to a different location changes the air inlet transfer function.

Figure 9:
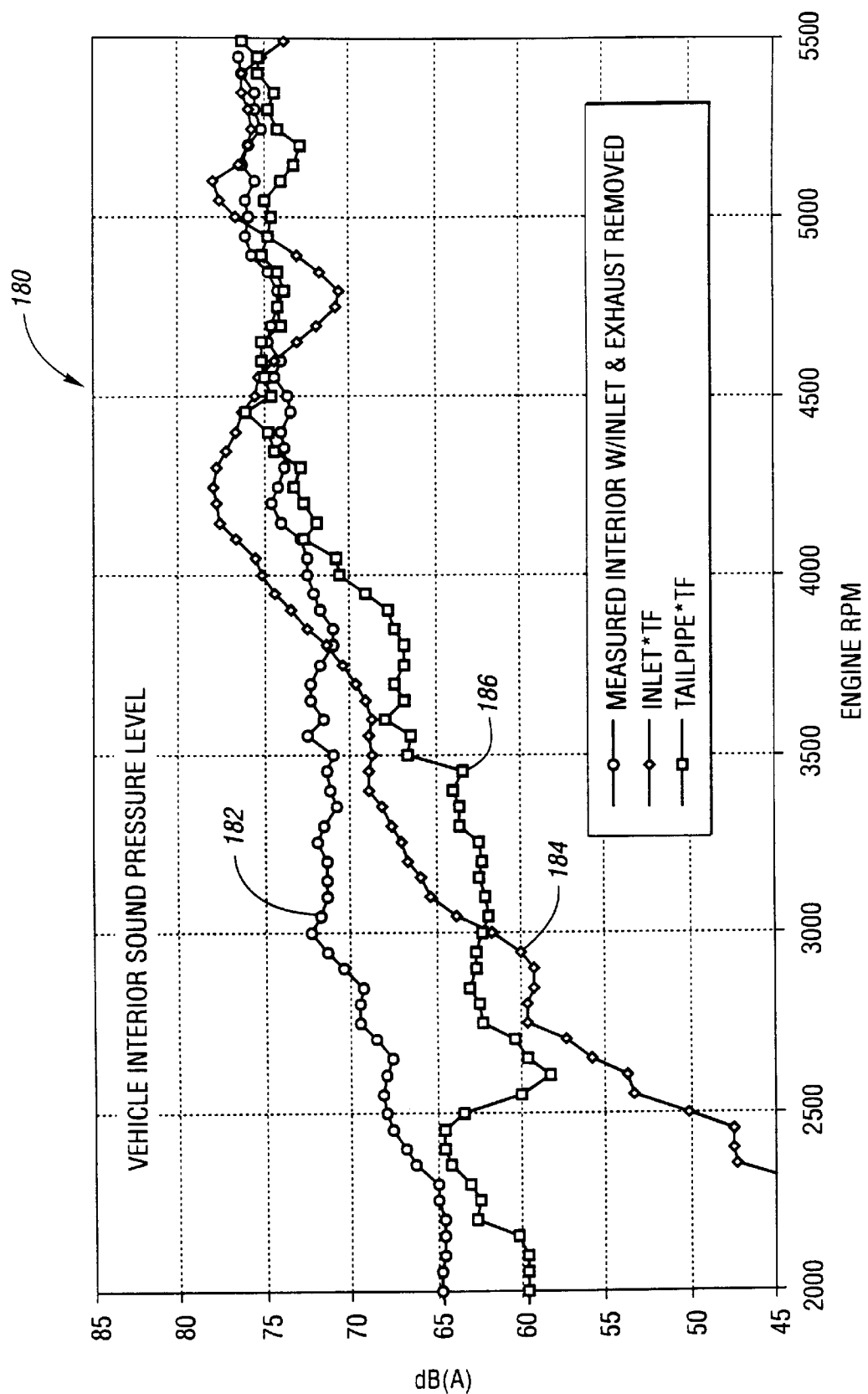
FIGS. 9–11 are graphs depicting sound pressure level as a function of engine speed.
Figure 10:
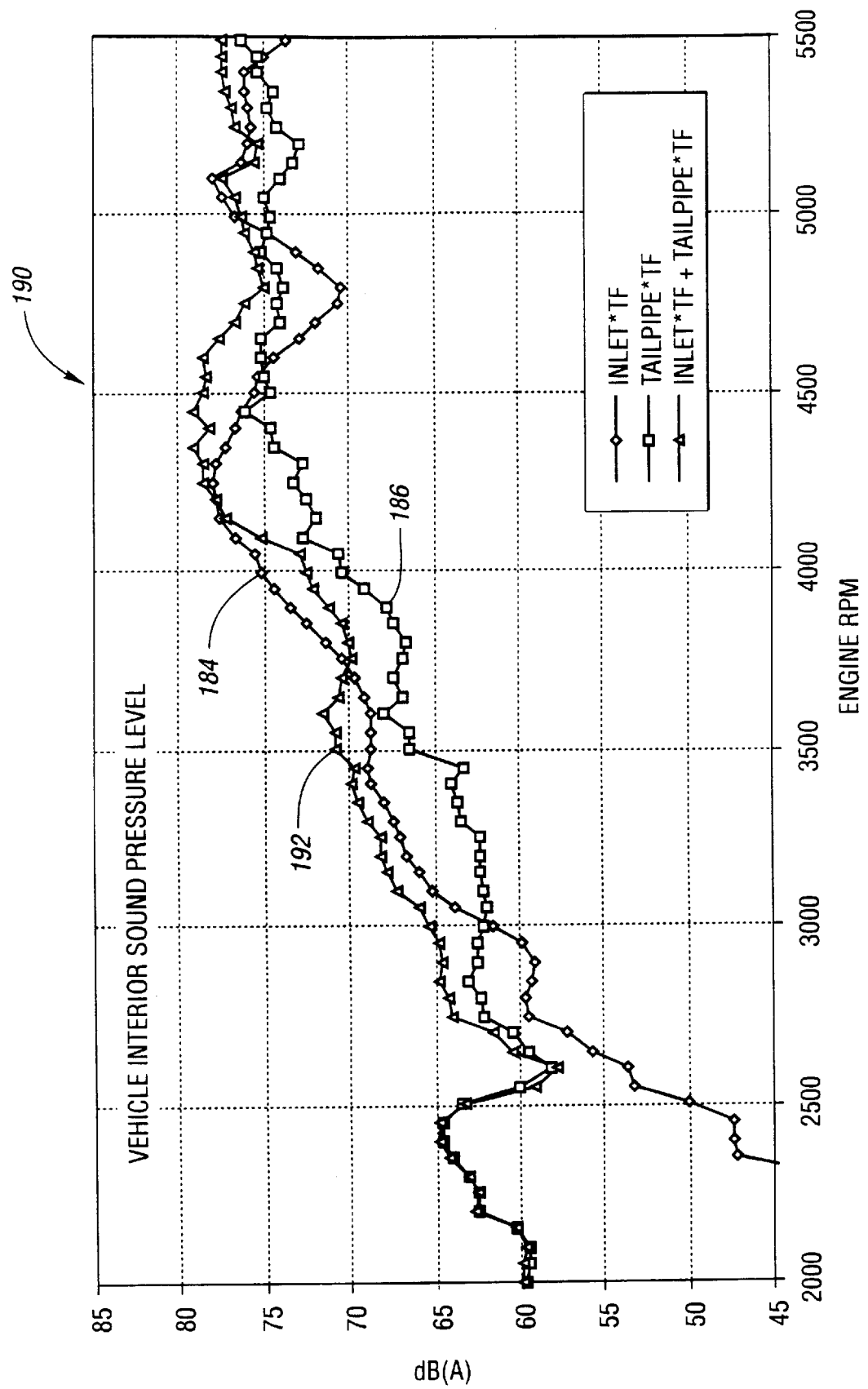
Figure 11:
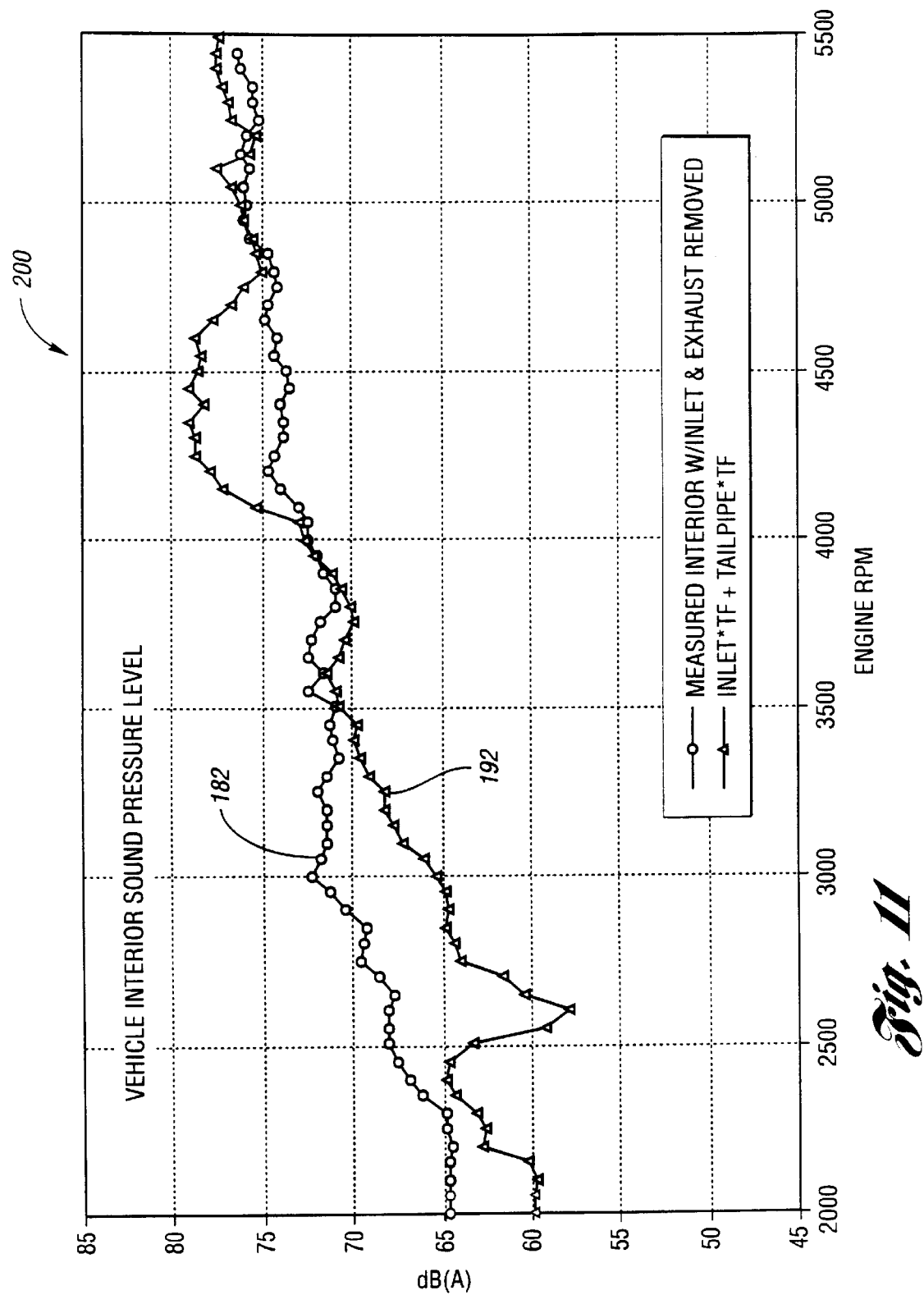

In an exemplary arrangement, FIG. 9 illustrates a comparison of sound pressure levels at 180. Plot 182 illustrates measured interior noise with inlet and exhaust noises removed. Plot 184 illustrates the overall sound pressure level of the inlet frequency response multiplied in the frequency domain with the inlet transfer function. Plot 186 indicates the overall sound pressure level of the outlet frequency response multiplied in the frequency domain with the outlet transfer function. That is, FIG. 9 shows the calculated interior noise for the inlet and exhaust noise compared to the measured interior noise with the inlet and tailpipe noise ducted away. As can be seen in the speed range above 3800 rpm, the inlet and/or tailpipe noises are equal to or greater than the other noises. As a result, it is important to know how the inlet and tailpipe noises interact within the vehicle interior. FIG. 10 illustrates a comparison of sound pressure levels at 190. In addition to plots 184 and 186, plot 192 illustrates the vector addition of inlet and tailpipe noise after their respective transfer functions have been applied. Because of the phase relationship between the two noise sources, various degrees of reinforcement or cancellation exist. From 3800 to 4100 rpm, there is partial wave cancellation, that is, the sum is less than the highest component. At 4550 rpm, where the inlet and tailpipe amplitudes are equal, the sum is three decibels higher than the components. At higher speeds, where the amplitudes are equal, the sum is only one-two decibels above the components. FIG. 11 illustrates a comparison of sound pressure levels at 200. Plot 192 shows the vector addition of inlet and tailpipe noise after their respective transfer functions have been applied. Plot 182 shows the measured interior noise with the inlet and exhaust noises removed.

Figure 12:
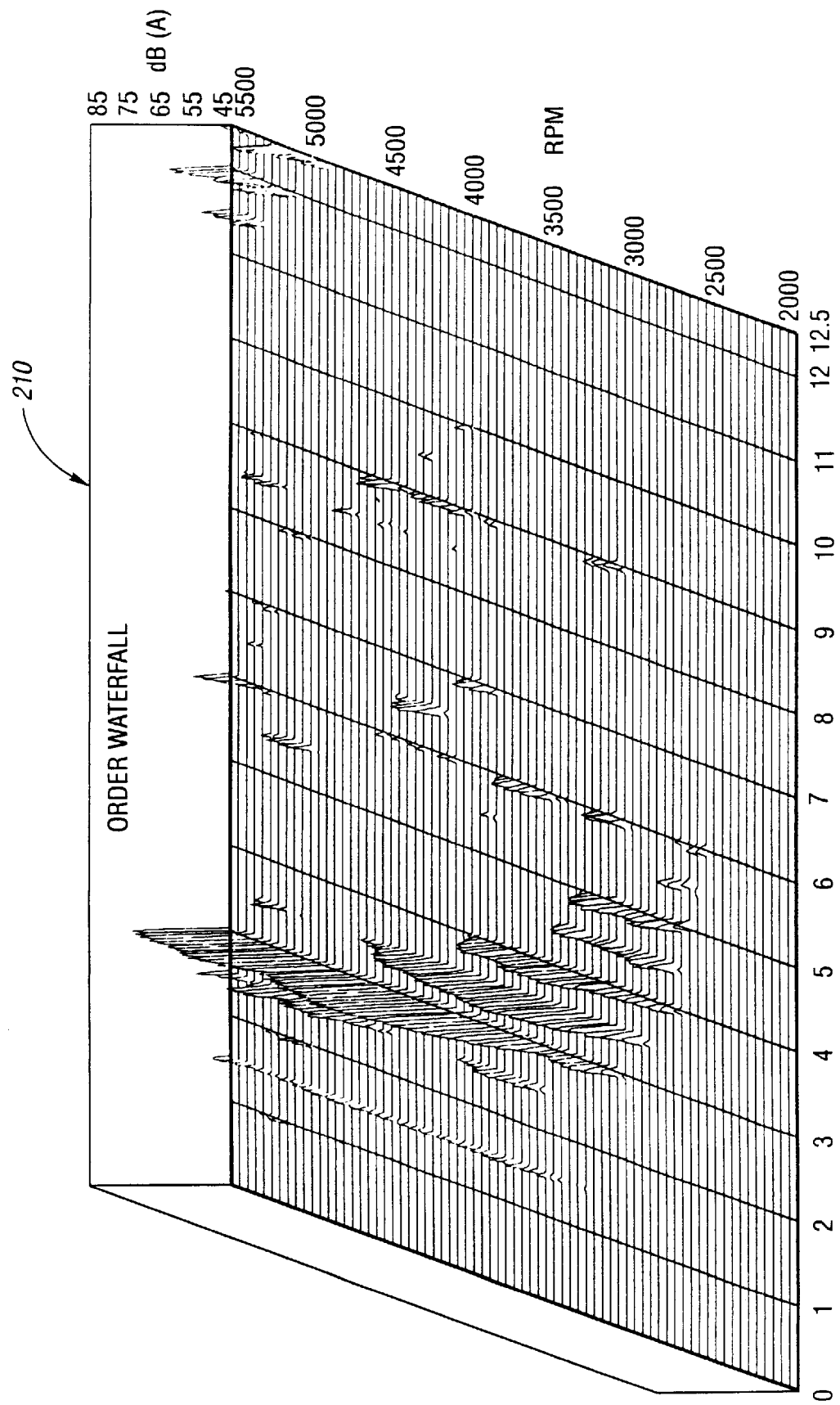
FIG. 12 is a waterfall diagram illustrating the inlet frequency responses multiplied in the frequency domain with the inlet transfer function.
Figure 13:
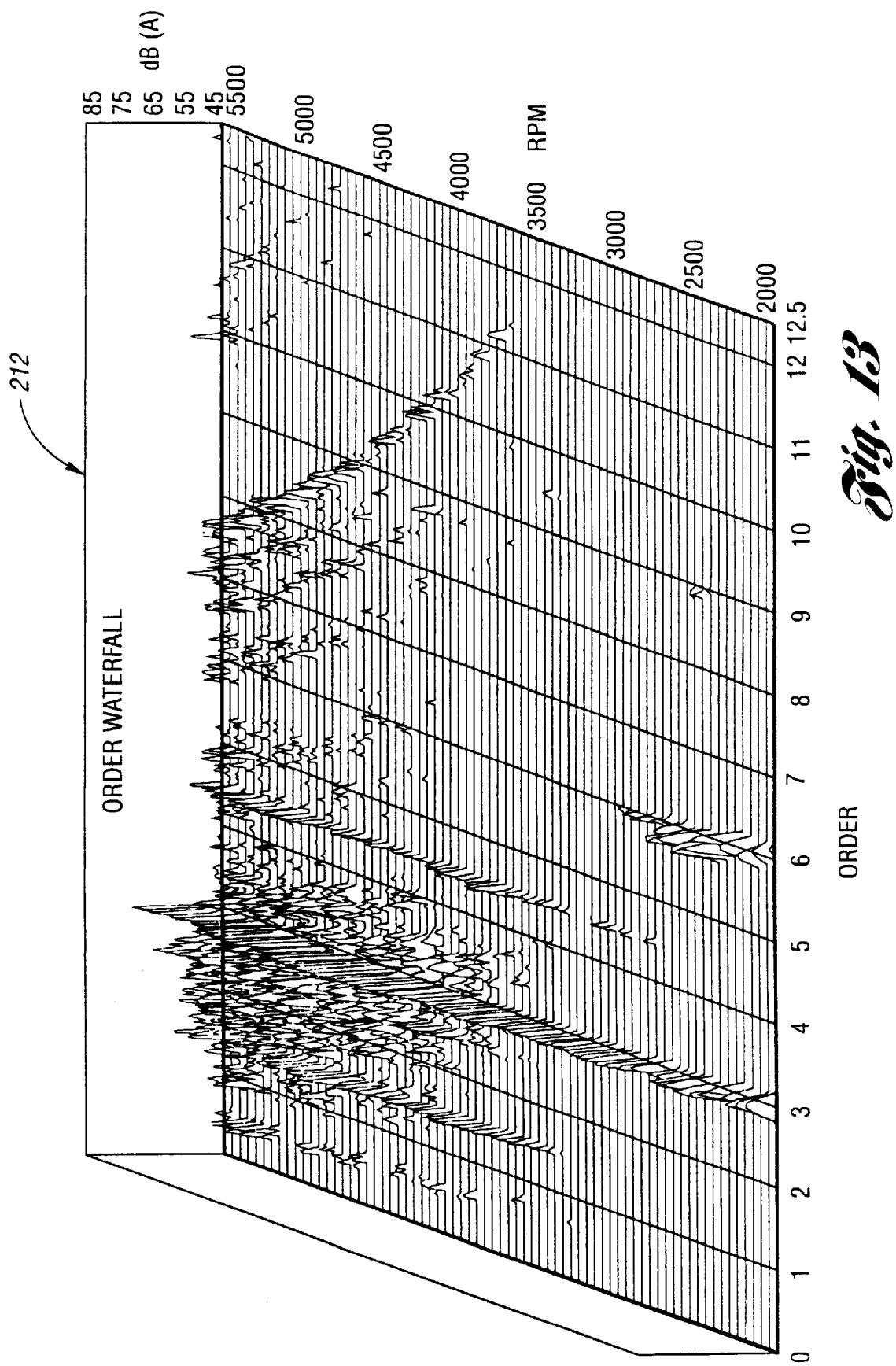
FIG. 13 is a waterfall diagram illustrating the exhaust frequency responses multiplied in the frequency domain with the exhaust transfer function.
Figure 14:
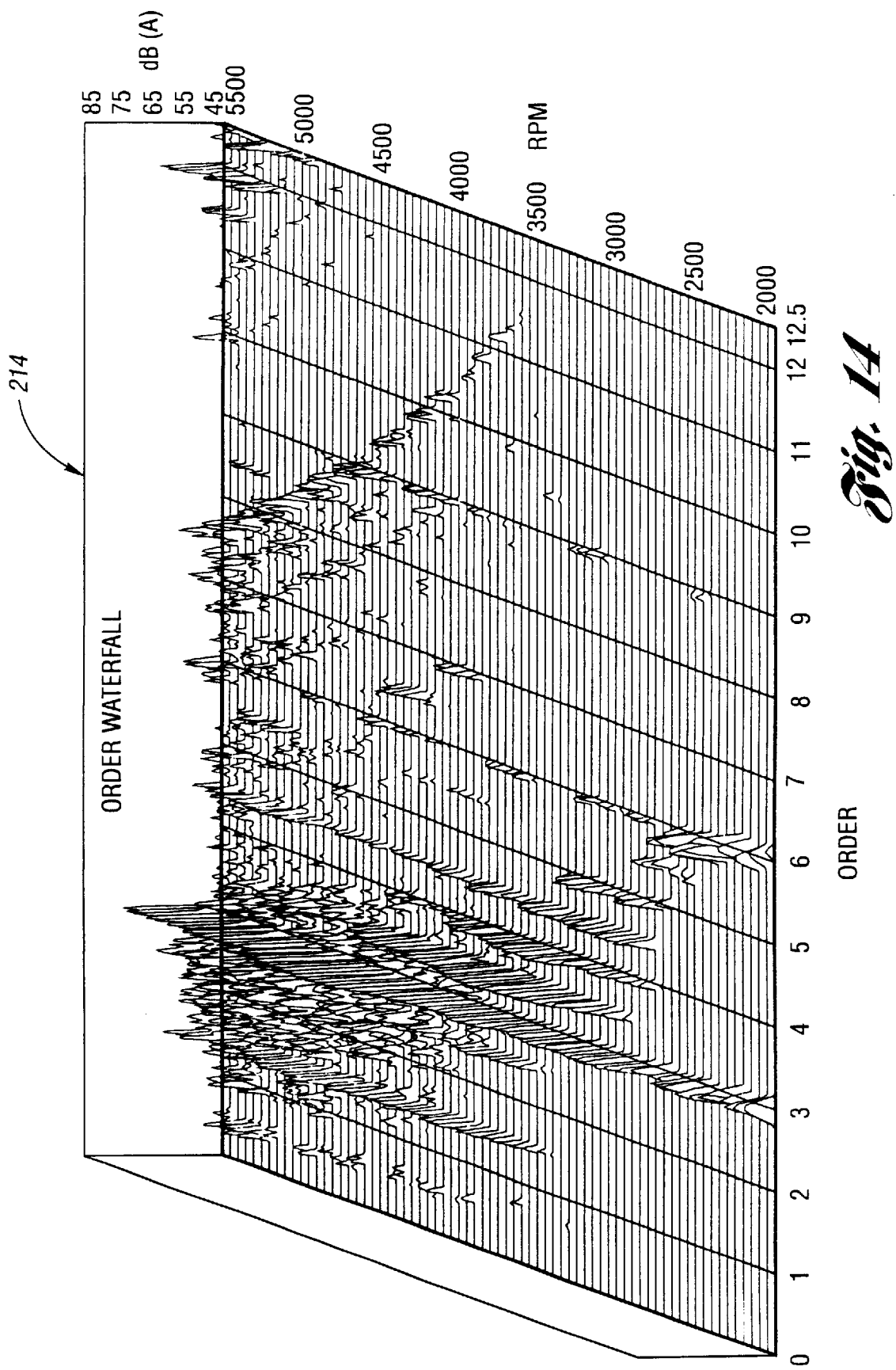
FIG. 14 is a waterfall diagram illustrating the sum of the waterfalls shown in FIGS. 12 and 13.
Figure 15:
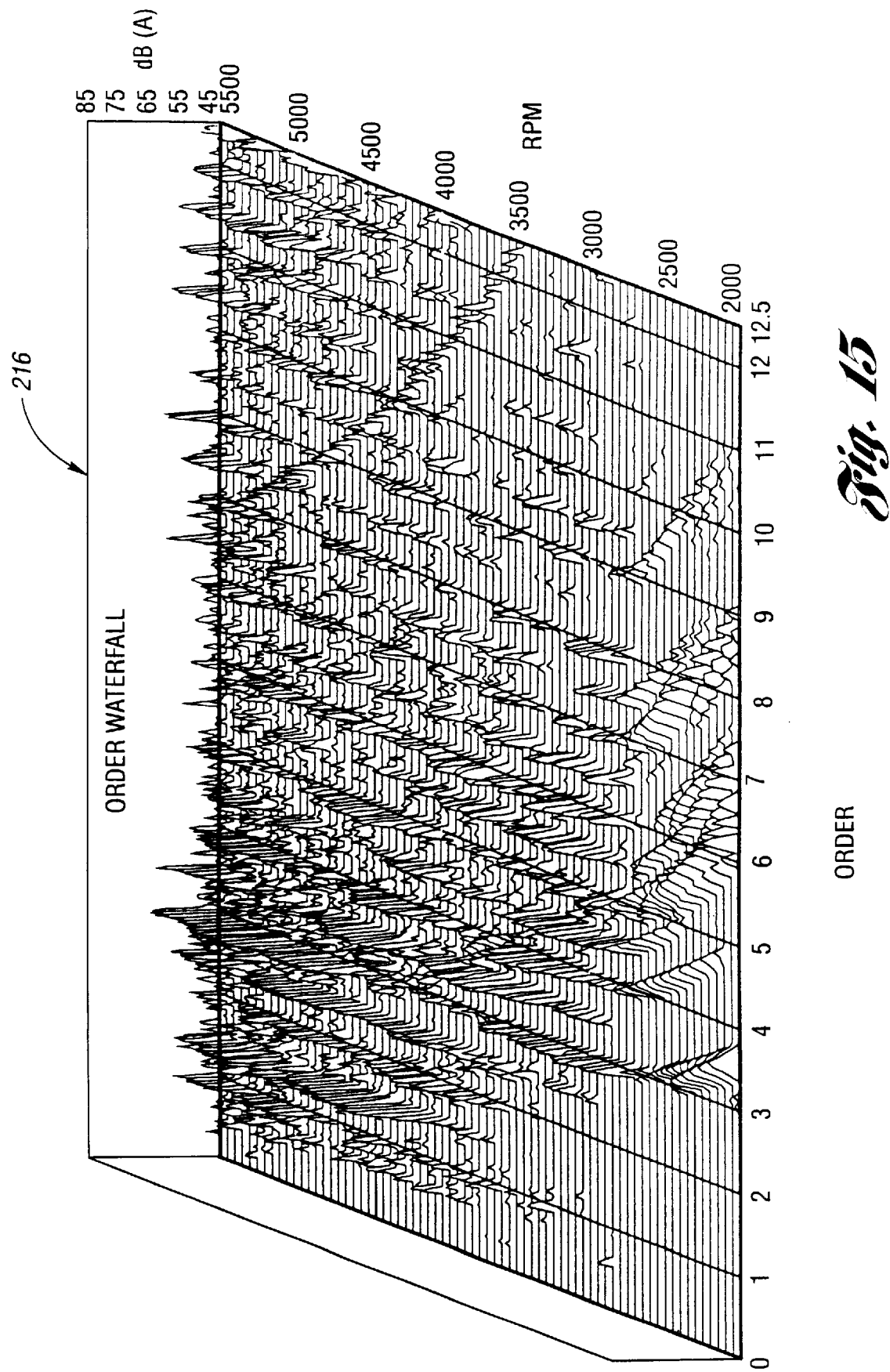
FIG. 15 is a waterfall diagram illustrating the interior noise spectrum as measured at the driver right ear with the inlet and exhaust noise of FIG. 14 removed.

FIGS. 12–15 illustrate various waterfall diagrams from an exemplary performance of a method of the present invention, and facilitate a greater appreciation for the sound pressure level curves in FIGS. 9–11. FIG. 12 is a waterfall diagram 210 illustrating the inlet frequency responses multiplied in the frequency domain with the inlet transfer function. FIG. 13 is a waterfall diagram 212 illustrating the exhaust frequency responses multiplied in the frequency domain with the exhaust transfer function. Alternatively, calculations may be carried out by convolving in the time domain. FIG. 14 is a waterfall diagram 214 illustrating the sum of the waterfall shown in FIGS. 12 and 13. FIG. 15 is a waterfall diagram 216 illustrating the interior noise spectrum as measured at the driver right ear with the inlet and exhaust noise of FIG. 14 removed.

While the best mode for carrying out the invention has been described in detail, those familiar with the art to which this invention relates will recognize various alternative designs and embodiments for practicing the invention as defined by the following claims.

What is claimed is:

1. A method of tuning a vehicle having an interior and an engine operable over a range of engine speeds, the engine having an air in/out system including an induction system inlet port and an exhaust system outlet port, the method comprising:

measuring a plurality of inlet frequency responses at the inlet port to a plurality of different engine speed inputs, each inlet response including an amplitude response and a phase response;

measuring a plurality of outlet frequency responses at the outlet port to a plurality of different engine speed inputs, each outlet response including an amplitude response and a phase response;

determining an inlet transfer function that generates a frequency response, including an amplitude response and a phase response, at the vehicle interior to an input at the inlet port;

determining an outlet transfer function that generates a frequency response, including an amplitude response and a phase response, at the vehicle interior to an input at the outlet port;

determining an interior noise spectrum based on the plurality of inlet frequency responses, the inlet transfer function, the plurality of outlet frequency responses, and the outlet transfer function; and modifying the engine air in/out system based on the interior noise spectrum to result in a different interior noise spectrum.

2. The method of claim 1 wherein measuring the plurality of inlet frequency responses further comprises:

for each different engine speed input, measuring the inlet response at a plurality of different frequencies in an audible spectrum wherein adjacent frequencies are less than one-third octave apart from each other.

3. The method of claim 2 wherein measuring the plurality of outlet frequency responses further comprises:

for each different engine speed input, measuring the outlet response at a plurality of different frequencies in an audible spectrum wherein adjacent frequencies are less than one-third octave apart from each other.

4. The method of claim 3 wherein determining the inlet transfer function further comprises:

measuring an interior frequency response to a white noise input at the inlet port.

5. The method of claim 4 wherein determining the outlet transfer function further comprises:

measuring an interior frequency response to a white noise input at the outlet port.

6. The method of claim 5 wherein determining the interior noise spectrum further comprises:

multiplying the plurality of inlet frequency responses by the inlet transfer function, in a frequency domain, to produce a first plurality of interior frequency responses;

multiplying the plurality of outlet frequency responses by the outlet transfer function, in the frequency domain, to produce a second plurality of interior frequency responses; and adding the first and second pluralities of interior frequency responses to produce a third plurality of interior frequency responses.

7. The method of claim 6 wherein the engine has a firing frequency and modifying the engine air in/out system further comprises:

modifying the engine air in/out system so that the resulting different interior noise spectrum emphasizes frequencies that are multiples of the engine firing frequency.

8. The method of claim 7 wherein modifying the engine air in/out system further comprises:

adding an expansion chamber to the air in/out system.

9. The method of claim 7 wherein modifying the engine air in/out system further comprises:

adding a quarter wave resonator to the air in/out system.

10. The method of claim 7 wherein modifying the engine air in/out system further comprises:

adding a Helmholtz resonator to the air in/out system.

11. The method of claim 1 wherein measuring the plurality of inlet frequency responses further comprises:

for each different engine speed input, measuring the inlet response at a plurality of different frequencies in the audible spectrum wherein adjacent frequencies are about 2 Hz apart from each other.

12. The method of claim 11 wherein measuring the plurality of outlet frequency responses further comprises:

for each different engine speed input, measuring the outlet response at a plurality of different frequencies in the audible spectrum wherein adjacent frequencies are about 2 Hz apart from each other.

13. The method of claim 12 wherein measuring the plurality of inlet frequency responses further comprises:

for each different engine speed input wherein adjacent engine speeds in the plurality of engine speeds are about 50 rpm apart from each other, measuring the inlet response at a plurality of different frequencies in the audible spectrum wherein adjacent frequencies are about 2 Hz apart from each other.

14. The method of claim 13 wherein measuring the plurality of outlet frequency responses further comprises:

for each different engine speed input wherein adjacent engine speeds in the plurality of engine speeds are about 50 rpm apart from each other, measuring the outlet response at a plurality of different frequencies in the audible spectrum wherein adjacent frequencies are about 2 Hz apart from each other.

* * * * *